March 15, 1932. C. H. OSLUND 1,849,548
LABELING MACHINE
Filed June 8, 1931 14 Sheets-Sheet 1
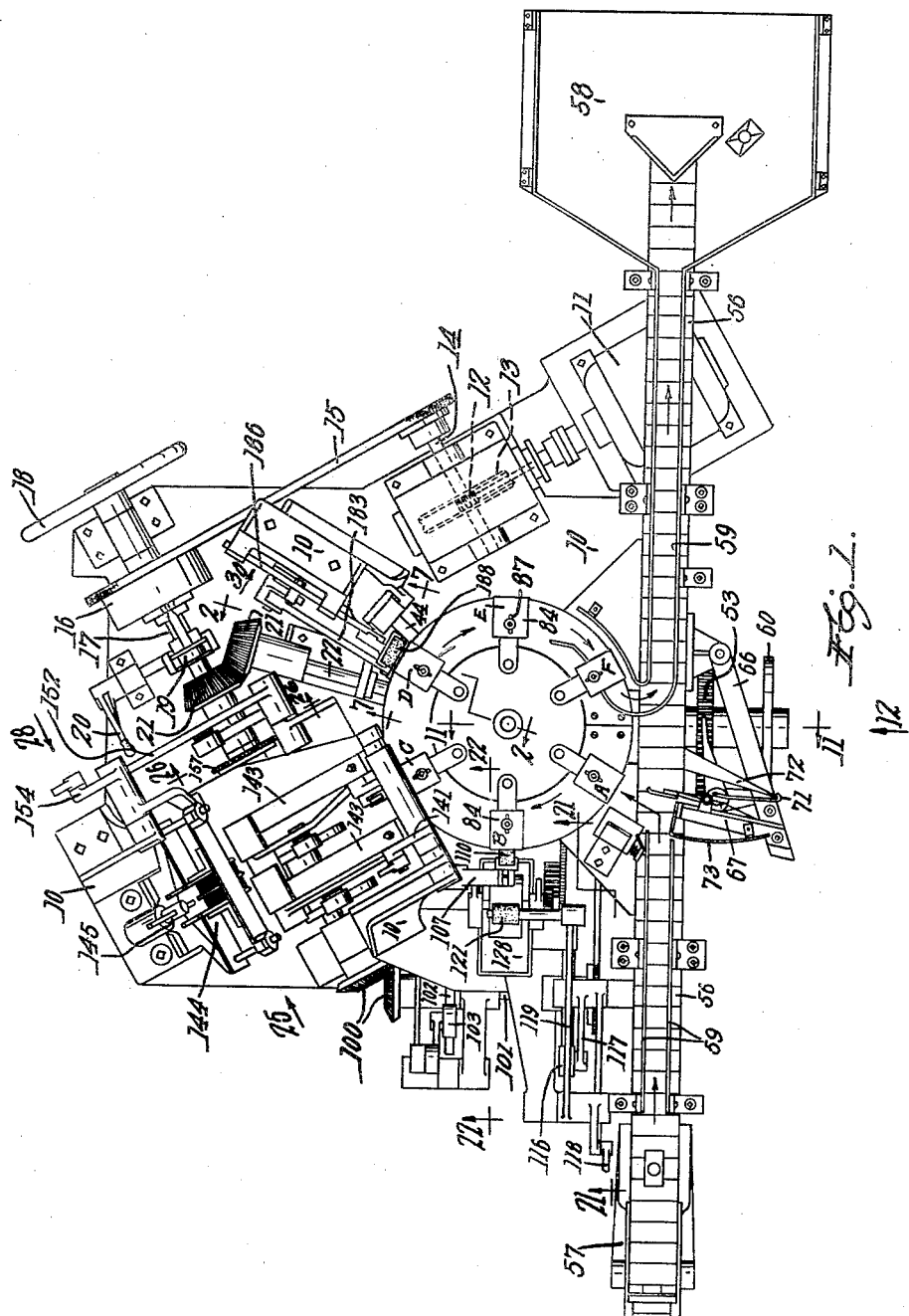
Inventor
Charles H. Oslund
By Attorneys
Southgate Fw & Hanly

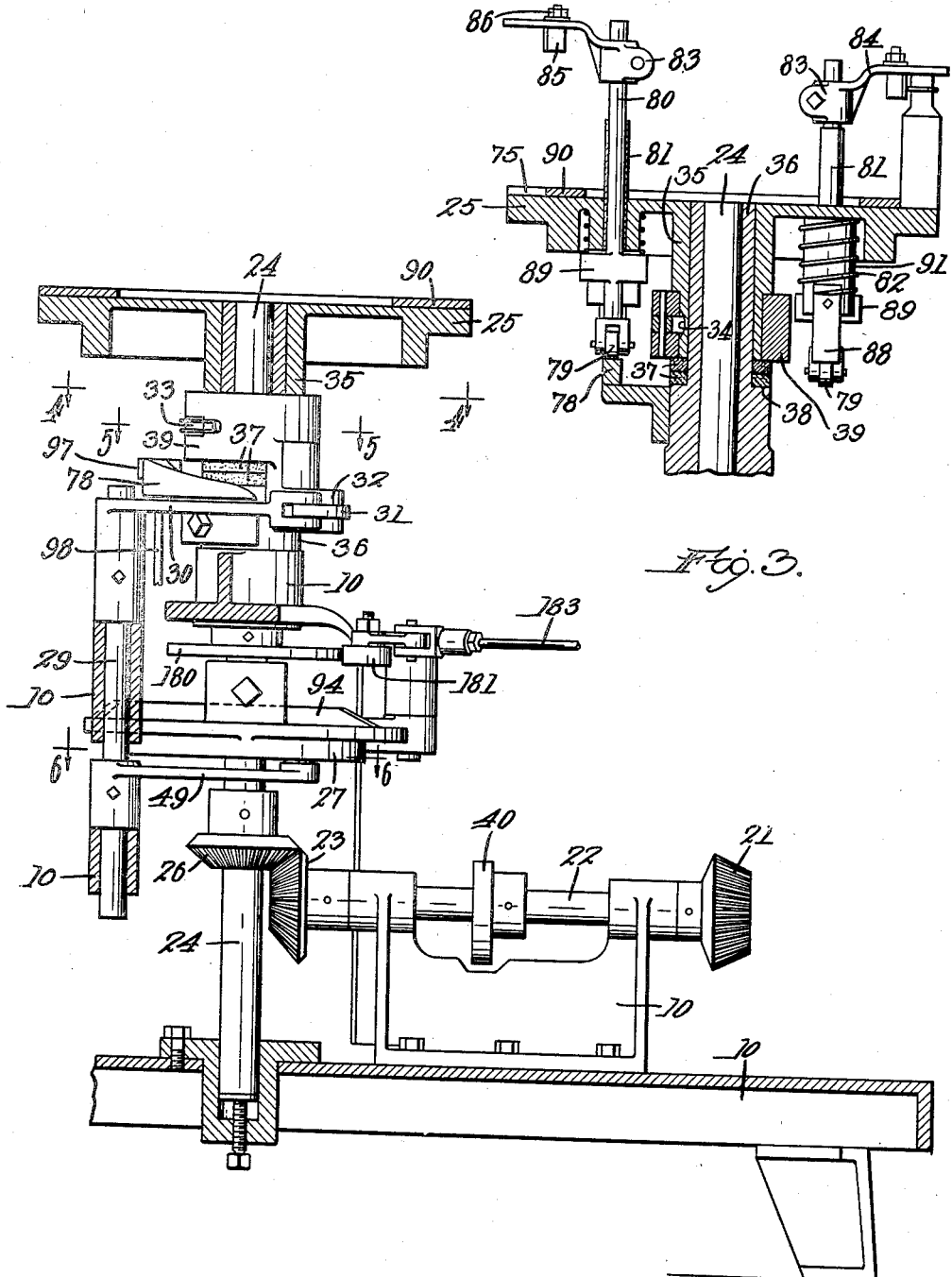

March 15, 1932. C. H. OSLUND 1,849,548
LABELING MACHINE
Filed June 8, 1931  14 Sheets-Sheet 3
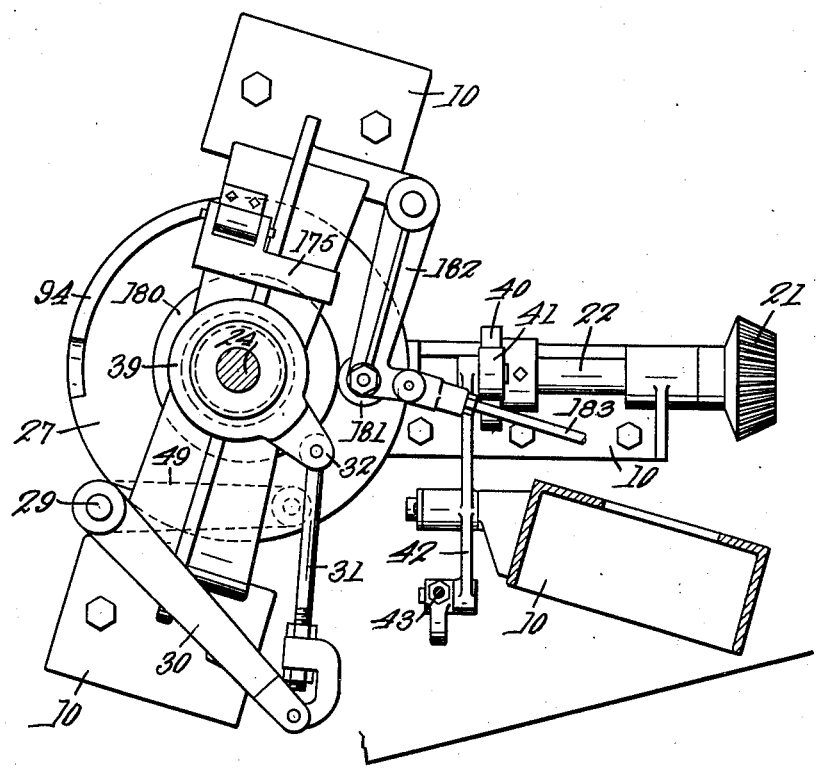
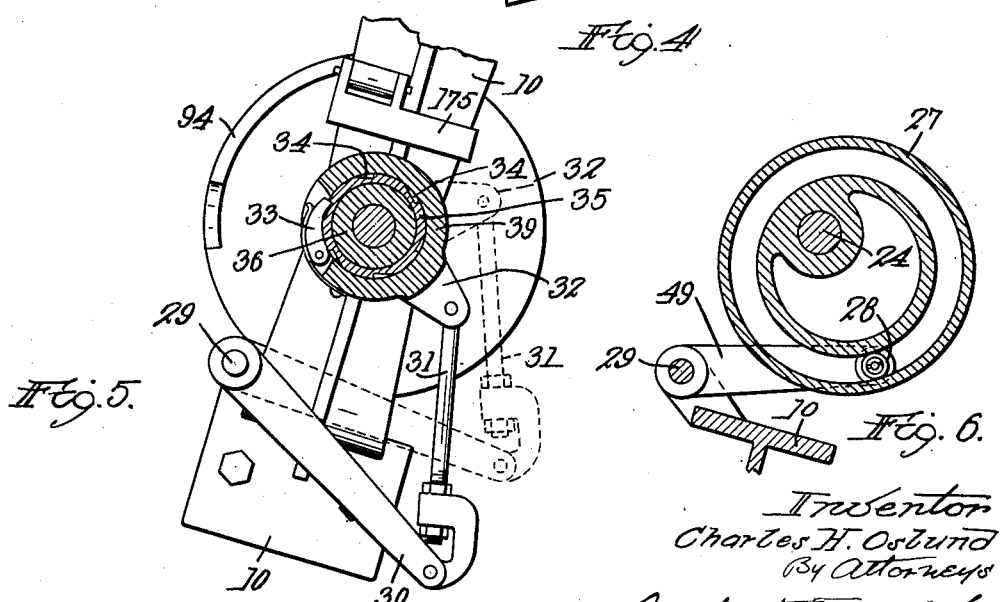

March 15, 1932.  C. H. OSLUND  1,849,548
LABELING MACHINE
Filed June 8, 1931   14 Sheets-Sheet 4

Inventor
Charles H. Oslund
By Attorneys
Southgate Fay & Hurley

March 15, 1932.  C. H. OSLUND  1,849,548
LABELING MACHINE
Filed June 8, 1931    14 Sheets-Sheet 5

Inventor
Charles H. Oslund
By Attorneys
Southgate Fay & Hawley

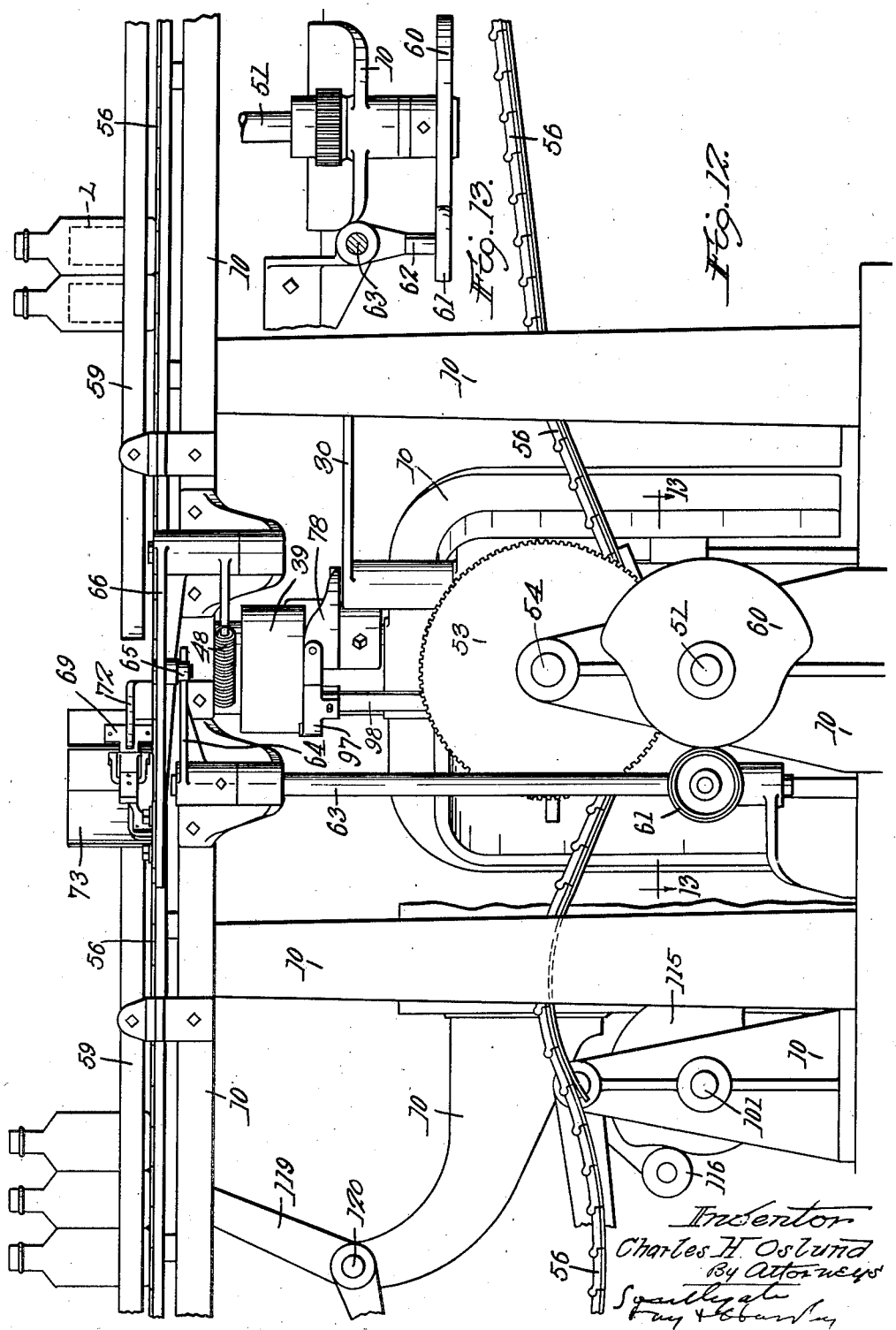

March 15, 1932. C. H. OSLUND 1,849,548
LABELING MACHINE
Filed June 8, 1931 14 Sheets-Sheet 7

Inventor
Charles H. Oslund
By Attorneys

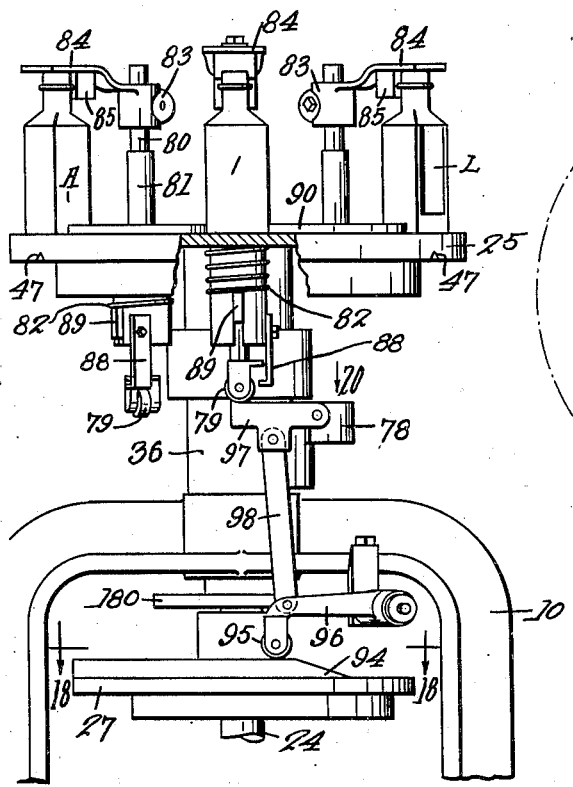
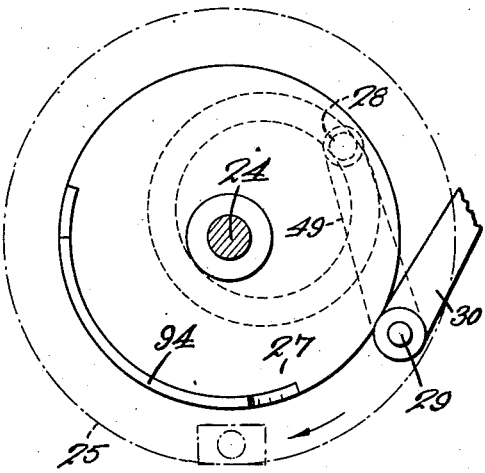
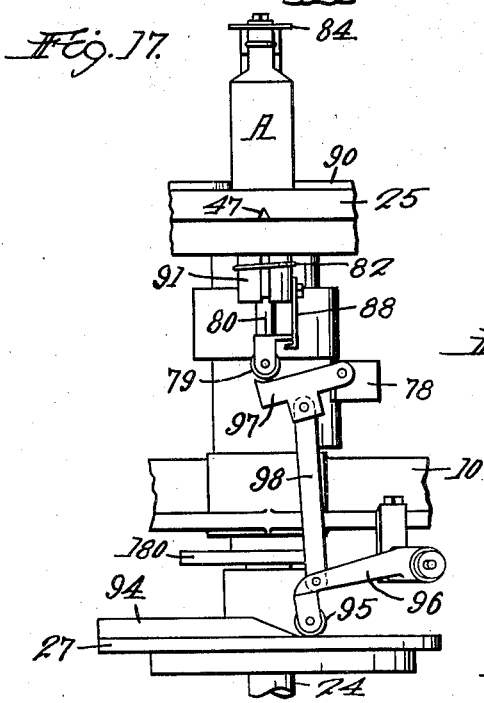

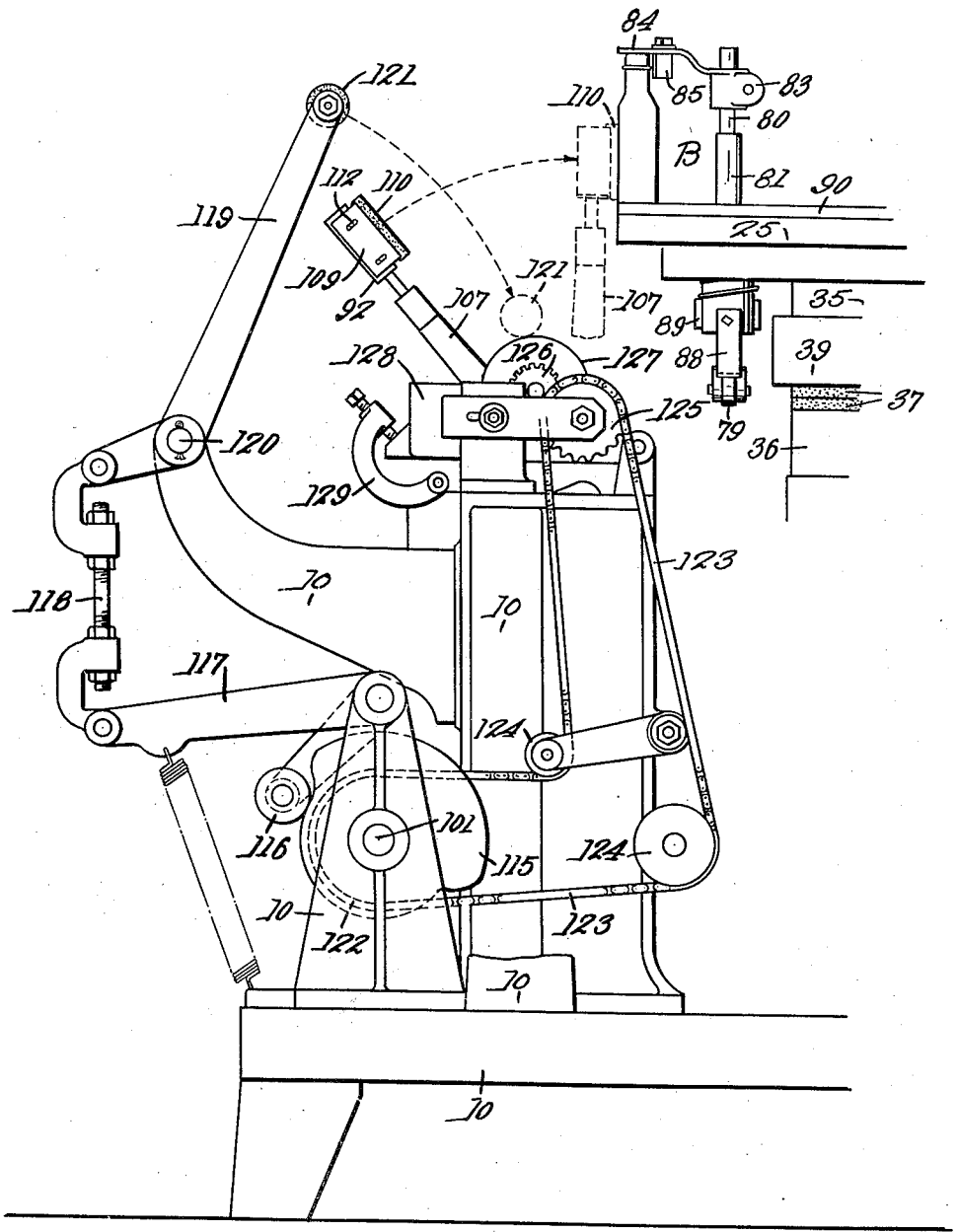

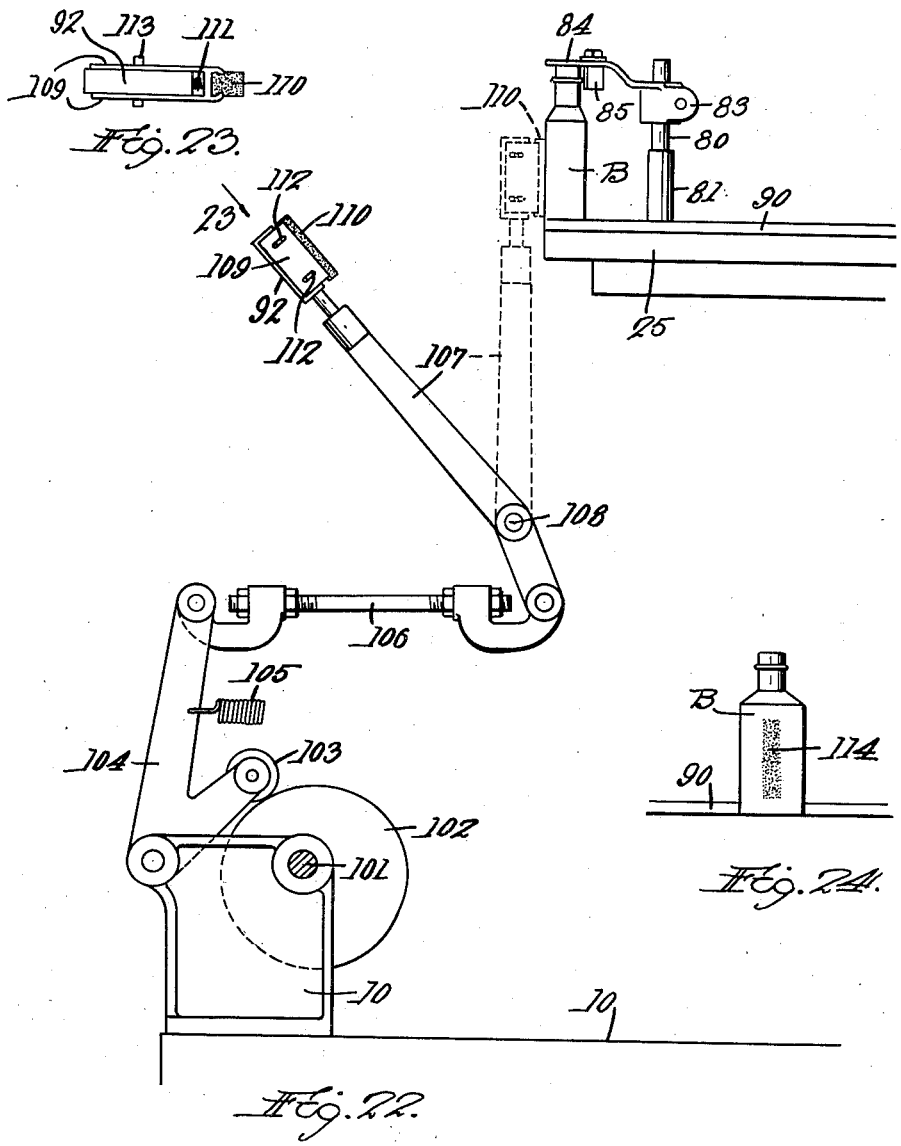

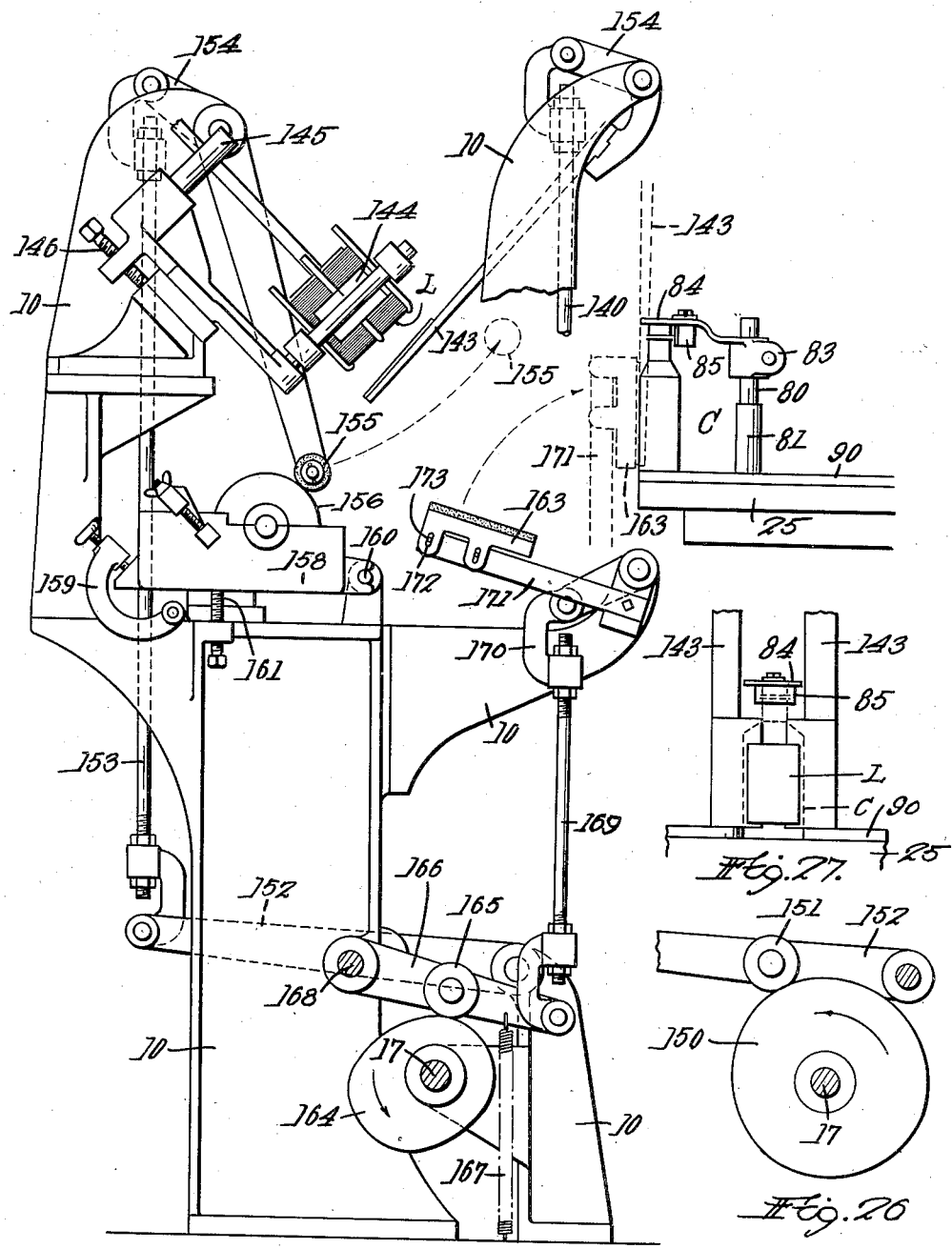

March 15, 1932. C. H. OSLUND 1,849,548
LABELING MACHINE
Filed June 8, 1931 14 Sheets-Sheet 12
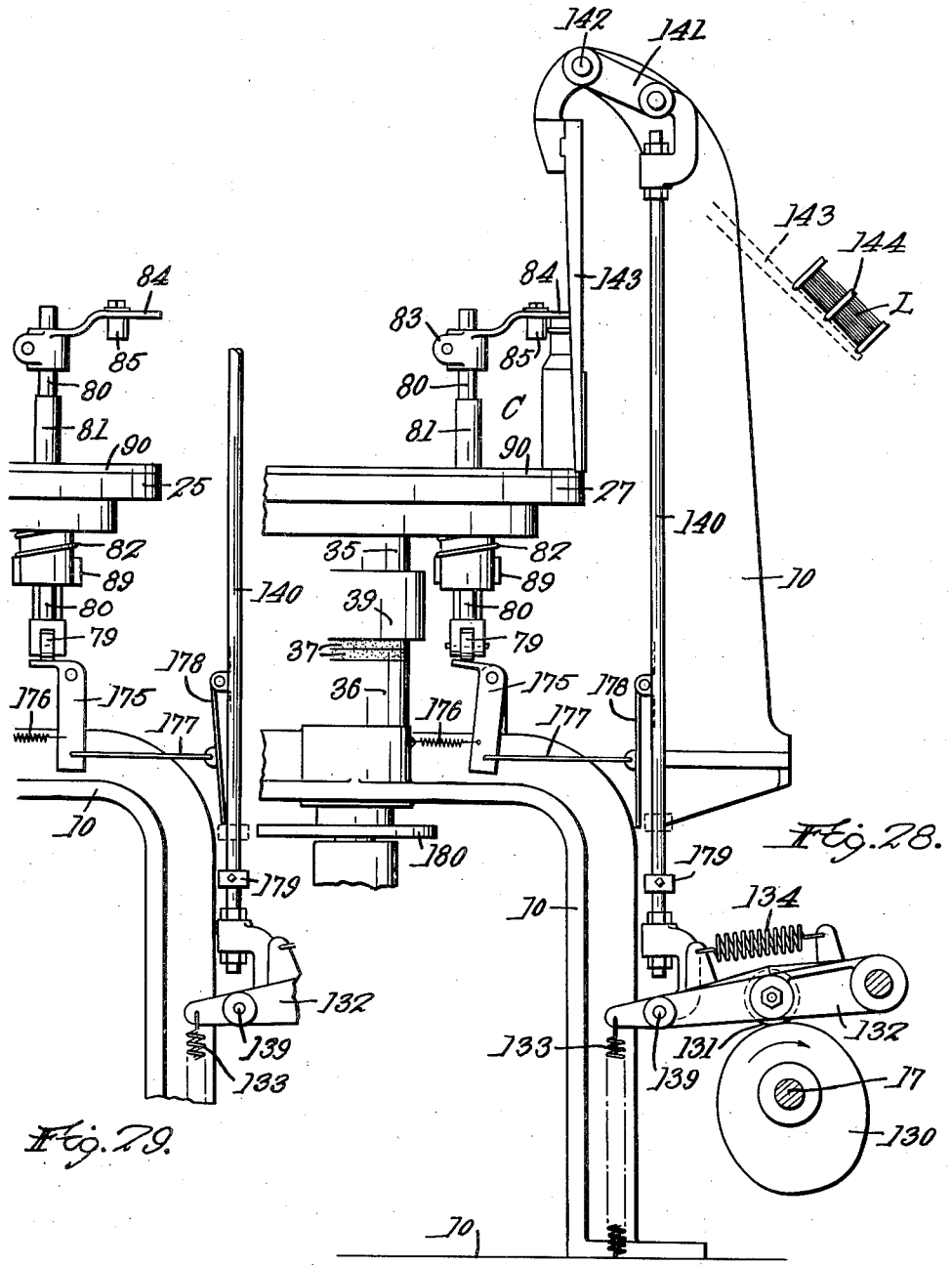
Inventor
Charles H. Oslund
By Attorneys
Southgate Fay & Hawley

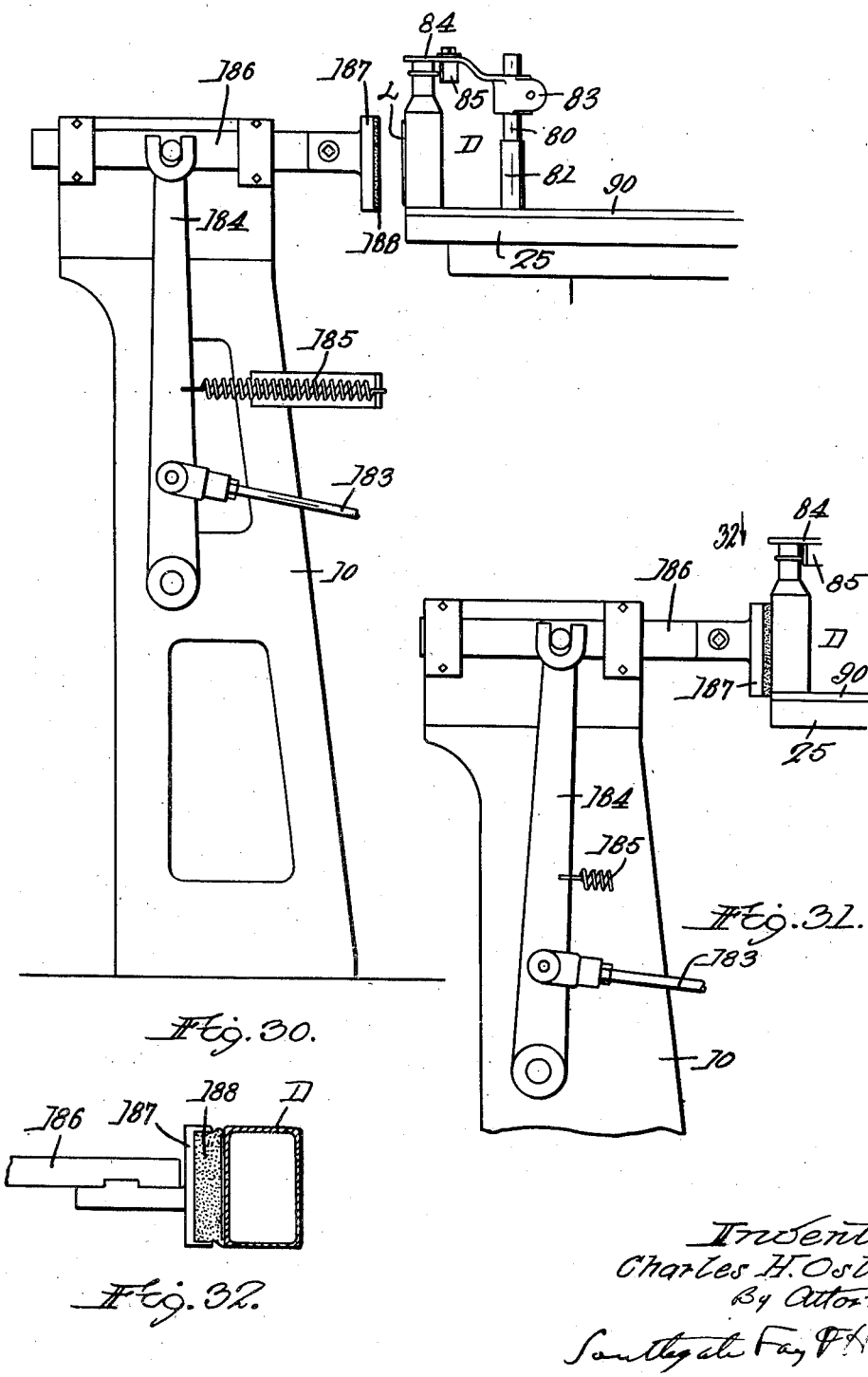

Patented Mar. 15, 1932

1,849,548

UNITED STATES PATENT OFFICE

CHARLES H. OSLUND, OF WORCESTER, MASSACHUSETTS, ASSIGNOR TO THE LIQUID CARBONIC CORPORATION, OF CHICAGO, ILLINOIS, A CORPORATION OF DELAWARE

LABELING MACHINE

Application filed June 8, 1931. Serial No. 542,728.

This invention relates to a machine particularly adapted for applying labels to the flat surfaces of bottles and the like on a rotary table, but also capable of labeling articles having curved surfaces.

The principal objects of the invention are to simplify the motions of the various devices which are ordinarily employed in applying labels to articles on rotary machines or other machines in which they are carried along a path while being labeled; to provide a rotary labeling machine with a table very much smaller than has been possible heretofore; to provide it with means whereby the article to be labeled is stopped when each one of the operations upon it is being performed; to provide an intermittent stop mechanism for the rotary table; to provide a novel and accurate means for controlling the clamping of the bottles on the table and their release in such a way that the clamping means will be held out of the way while a new bottle, or article to be labeled, is placed on the table; to provide a machine which will produce simpler labeling, secure the labels accurately in central position, and result in fewer flaws in the labeling operation; to provide a machine in which eventually the adhesive will be applied all over the rear surface of the label; to provide for applying the adhesive to the articles or bottles first so as to be able to fix the label on the bottle at the center; to provide means in addition thereto for applying the adhesive to the parts of the label not coming in contact with the adhesive on the bottle; to provide means for spotting the label on the stationary bottle with the adhesive on the bottle and practically fixing the label in that way; to provide improved and simplified means for moving the articles on the table; to simplify the motion of the pickers and thus reduce the speed at which they operate for the same speed of delivery; to eliminate the usual large number of grip fingers by using only one; to provide an arrangement whereby the label is applied to what might be called the circumferential surface of the bottle, with respect to the rotary table, instead of to the front surface as usual; to do away with the usual turrets for delivering the articles to the table and taking them therefrom, and in general, to provide an effective means for applying labels to a single or flat surface of an article, preferably retaining the rotary table type of machine.

Many other features are novel or improved relating to the different elements of the labeling machine.

Other objects and advantages of the invention will be hereinafter described.

Reference will be had to the accompanying drawings, in which

Fig. 1 is a plan of a complete labeling machine constructed in accordance with this invention;

Fig. 2 is a sectional view on the broken line 2—2 of Fig. 1, showing the central shaft in elevation;

Fig. 3 is a sectional view of the top part of the central shaft and associated parts taken at an angle to Fig. 2;

Figure 7:
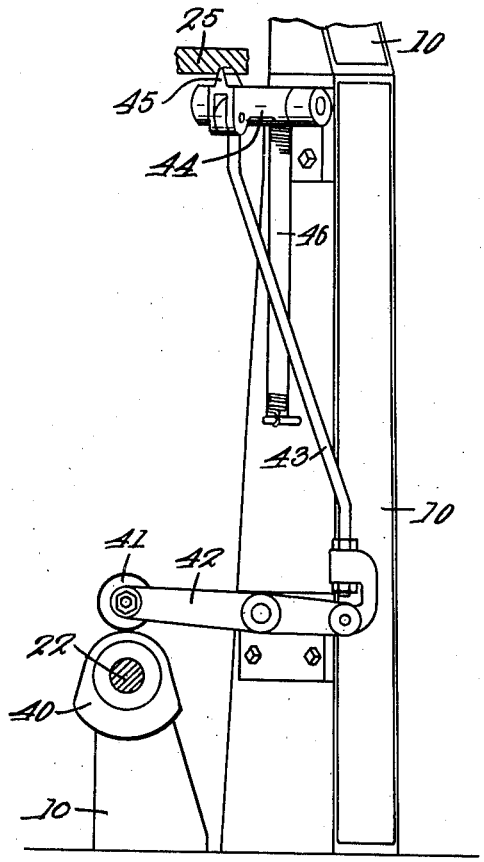
Figure 8:
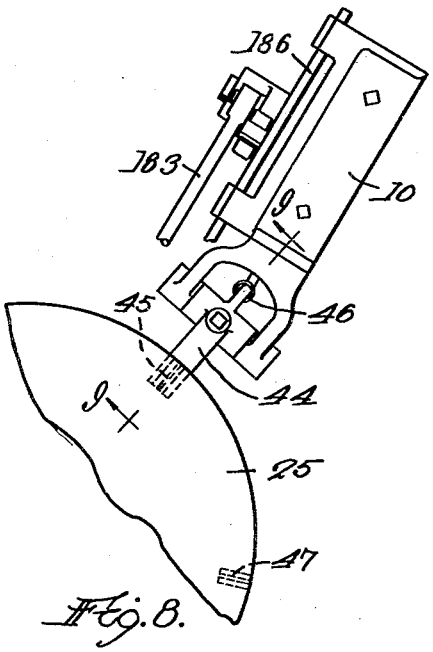
Figure 9:
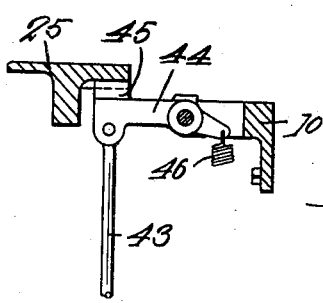
Figure 10:
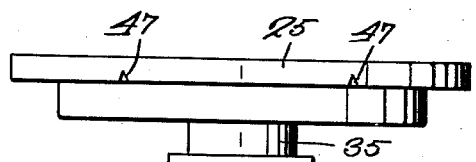
Figure 11:
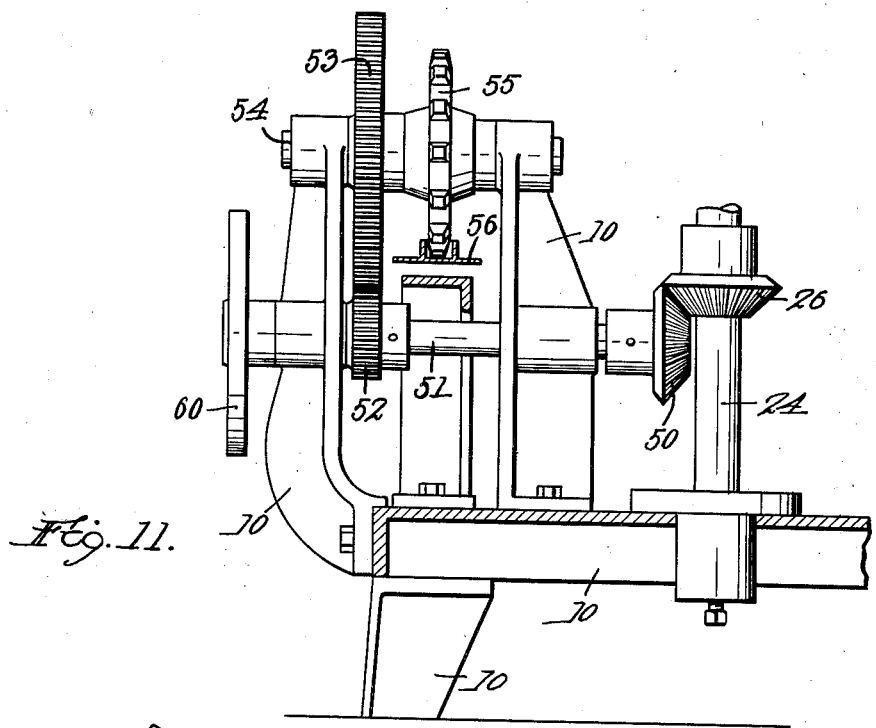
Figure 20:
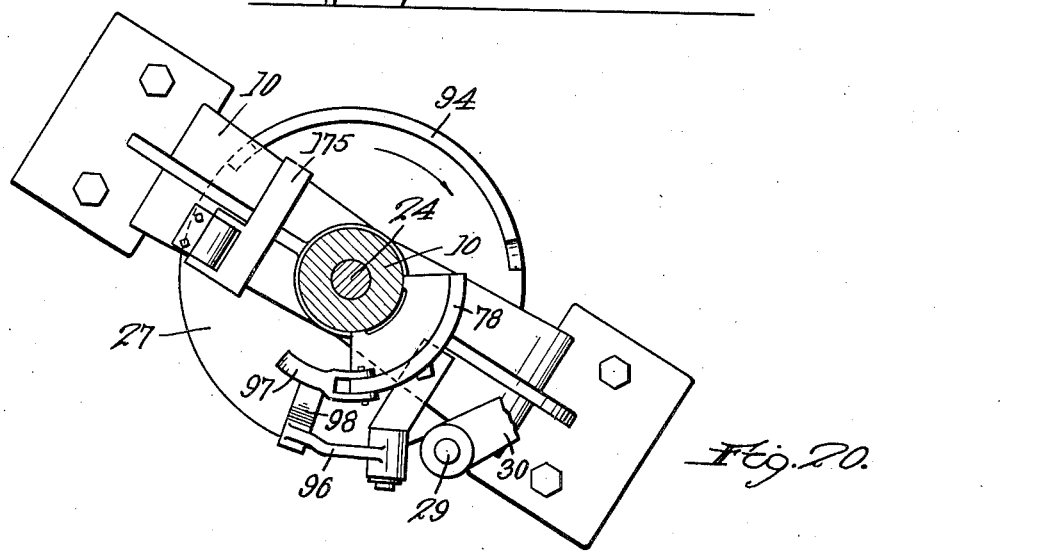
Figure 14:
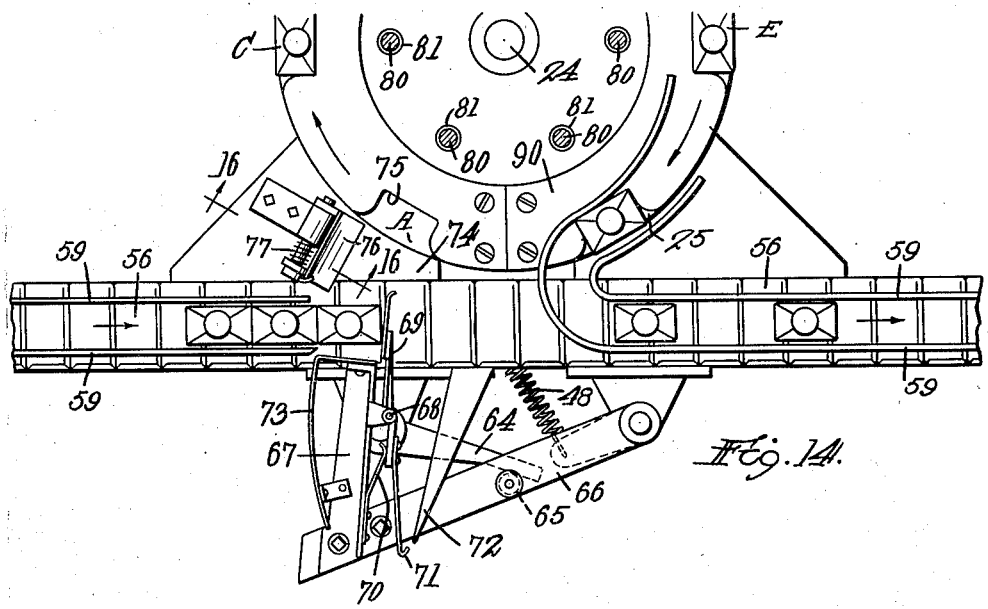
Figure 15:
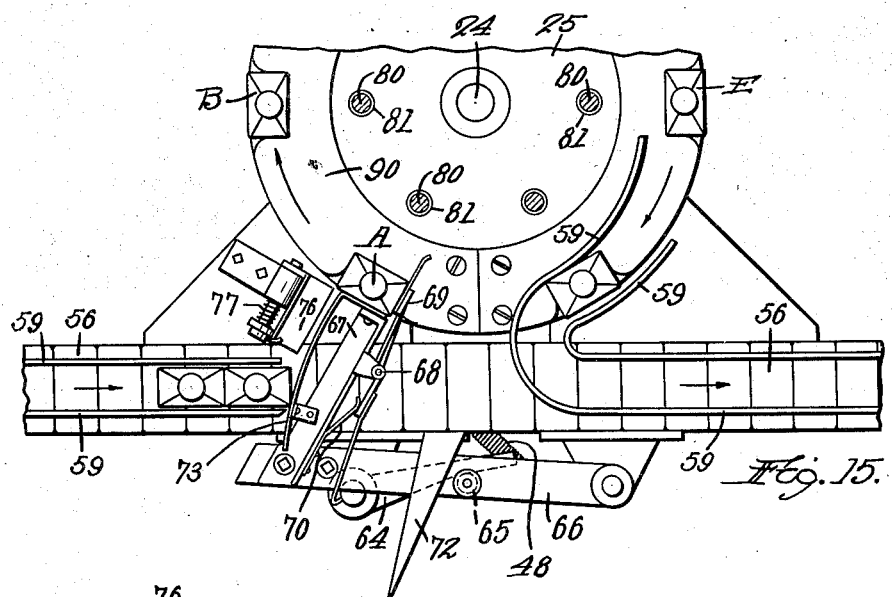
Figure 16:
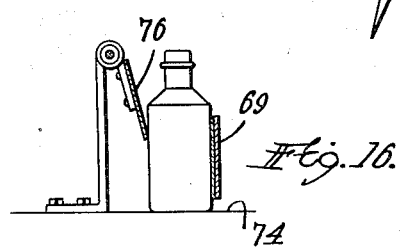
Figure 33:
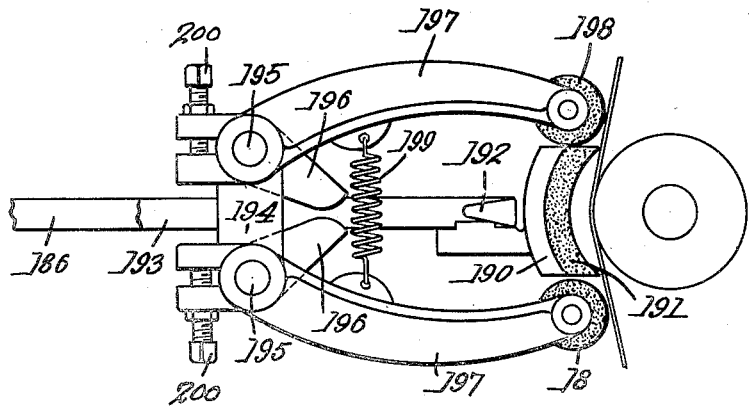
Figure 34:
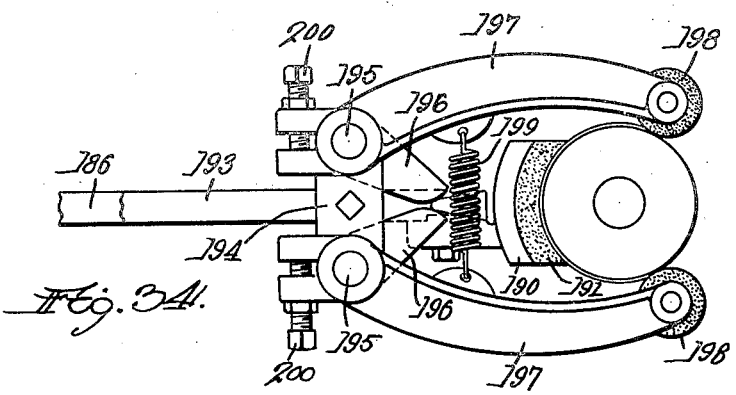
Figure 35:
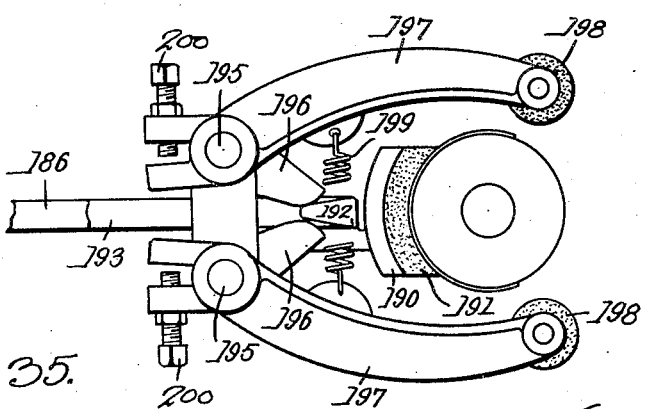

Figs. 4, 5 and 6 are horizontal sectional views on the lines 4—4, 5—5 and 6—6 respectively of Fig. 2 looking down;

Fig. 7 is a substantially tangential sectional view on the line 7—7 of Fig. 1, looking outwardly from the table;

Fig. 8 is a plan of a section of the table showing the table registering means;

Fig. 9 is a radial sectional view on the line 9—9 of Fig. 8;

Fig. 10 is a side view of the table;

Fig. 11 is a sectional view of the supply and discharge conveyor and the driving mechanism therefor on the line 11—11 of Fig. 1;

Fig. 12 is a side view of part of the conveyor mechanism and other parts behind it;

Fig. 13 is a plan in section on the line 13—13 of Fig. 12;

Fig. 14 is a plan of part of the table and conveyor adjacent thereto, together with the means for moving the articles from the conveyor to the table;

Fig. 15 is a similar plan showing the projection of a bottle from the conveyor on the surface of the table;

Fig. 16 is a sectional view on the tangential line 16—16 of Fig. 14;

Fig. 17 is an elevation of the table showing the release of a bottle clamp, this figure being partly broken away to show interior construction;

Fig. 18 is a sectional view on the line 18—18 of Fig. 17, showing the cams below in plan;

Fig. 19 is an elevation like Fig. 17 showing the operation of clamping the bottles on the table;

Fig. 20 is a plan looking in the direction of the arrow 20 in Fig. 17, showing the central shaft in section;

Fig. 21 is an elevation of the mechanism just inside the conveyor with the parts in section on the longitudinal broken line 21—21 of Fig. 1;

Fig. 22 is a similar sectional view on the line 22—22 of Fig. 1;

Fig. 23 is an end view of the lever for applying adhesive to the bottle taken as indicated by the arrow 23 in Fig. 22;

Fig. 24 is an elevation of the bottle in the position shown in Fig. 22 with the adhesive placed thereon;

Fig. 25 is a side view of the label gumming mechanism, taken at an angle as indicated by the arrow 25 in Fig. 1;

Fig. 26 is a sectional view on the line 26—26 of Fig. 1, showing the transfer roll cam;

Fig. 27 is a side view of the bottle being labeled in the position shown in Fig. 25 with the label applied;

Fig. 28 is a side view opposite to Fig. 25 as indicated by the arrow 28 in Fig. 21;

Fig. 29 is a view of the same showing the parts in a different position;

Fig. 30 is a side view of the means for pressing the label on the bottle after it is placed in position, taken as indicated by the arrow 30 in Fig. 1;

Fig. 31 is a view similar to Fig. 30 with the label pressing means in position against the bottle;

Fig. 32 is a plan of the bottle and label pressing means as indicated by the arrow 32 in Fig. 31;

Fig. 33 is a plan of a modified label wiping means for round bottles;

Fig. 34 is a similar plan showing this wiping operation just in the act of being completed, and Fig. 35 is a similar view showing the same wiping means spread out and ready to move back without again touching the bottle.

The whole machine is mounted on a base provided with supporting means in the form of brackets and projections for the various elements of the machine. The base, brackets and projections are all numbered 10 on the drawings to denote supporting means. On this frame is carried a motor 11 which, through a worm 12 and worm wheel 13, drives a shaft 14 at a reduced speed. This shaft is provided with pulley which carries a belt 15 driving a pulley on a clutch member 16, which is rotatable on a shaft 17 on which is a hand wheel 18 for turning the shaft by hand. The other member 19 of the clutch is operated by a handle 20 to connect the shaft with the clutch member 16 and thus drive it from the motor.

The shaft 17, by bevel gears 21, drives a shaft 22 which, by bevel gears 23 and 26 drives a vertical shaft 24. The other shafts heretofore mentioned are all shown as horizontal. The shaft 24 carries at its top the table 25, which constitutes the rotary support and carrier for the articles to be labeled but is not fixed to the shaft. While the machine is running and when the clutch 20 is in, these shafts are all running constantly.

The table 25 is supported on the top of the shaft 24 but it is not fixed to it and does not rotate with it except intermittently.

The shaft 24 is provided with an eccentric or cam 27 in the groove of which runs a roller 28 mounted on an arm 49 fixed to a vertical shaft 29 carried by the frame 10. Obviously the shaft 29 will oscillate as the shaft 24 rotates. On the upper end of this shaft 29 is an arm 30 which, through an adjustable link 31 also oscillates an arm 32 on a cylinder 39 carrying an inwardly spring-pressed pawl 33. This pawl engages in a circular rack 34 inside having, in this case, six teeth. This rack is a part of a hub 35 on which the table 25 is fixed. There is a sleeve 36 between the hub and the shaft 24. This hub 35 is supported by fiber washers 37 which, in turn, bear on an enlargement 38 on the sleeve.

In this way the table is rotated intermittently by the rotation of the shaft 24 and also is supported by the frame. Furthermore on account of the friction produced by the rotation of the table on the fiber washers, there is no danger of the table running over its limit. In other words it will move at each oscillation of the arm 30 throughout the space of one tooth of the rack 24 and will not overrun this motion. The sleeve 36 is stationary, being fixed to the frame 10.

On the shaft 22 is a cam 40. Once during each rotation of the shaft 22 and consequently once during each rotation of the shaft 24 this cam raises a roll 41 on a lever 42. This lever is connected by an adjustable link 43 with a lever 44 mounted on the frame 10. On the lever 44 is a radially and vertically disposed stop tooth 45 and a spring 46 forces this, at the end of each movement of the table, into one of a series of notches 47 on the underside of the table 25. In this case six of these notches are shown. This constitutes means for positively fixing and locating the table at the end of each motion so that the articles which, as will be described, are located on the table, will come to exactly the right position at the end of each motion of the table.

Operated by the gear 26 is another bevel gear 50 on a radial shaft 51 which carries upon it a gear or pinion 52. This gear or pinion is constantly in mesh with a gear 53 on a shaft 54, parallel with the shaft 51, both arranged radially. On this shaft 54 is a sprocket wheel 55 which engages in sprocket teeth on the inner side of the links of an endless carrier 56, which is arranged similarly to other endless carriers used in this class of machines. On its upper surface it carries the bottles or other articles from a feeding hopper or box 57, in which they are placed by hand or by another conveyor, to a point where they are deliverted on the table 25 and takes them from this table to the receiving platform 58. On the conveyor they move between vertical guides 59.

On the shaft 51 is a cam 60 which operates a roll 61 on an arm 62 carried by a vertical rod 63 with which the arm 62 is radially connected. The oscillation of this roll obviously oscillates the rod 63 on its own axis. On the top this rod carries an arm 64 adapted to engage and operate a roll 65 on a pivoted lever 66. This action therefore oscillates this lever 66 in its pivot in opposition to a spring 48 from a position shown in Fig. 15 to that shown in Figs. 1 and 14. The lever 66 has a rigid arm 67 to which is pivotally connected at 68 a lever 69 having a flat plate on the end adapted to be engaged by the bottles as shown in Fig. 14.

It will be understood that as the shaft 51 rotates constantly the arm 64 also oscillates constantly while the machine is running. When there is no bottle in the way, as shown in Fig. 1, a spring 70 swings the lever 69 over into such position that a hook 71 on the end engages the tip of a stationary projection 72 on the frame and holds the lever 66 out, as shown in that figure. Whenever a bottle comes into a position, as shown in Fig. 14, to engage the lever 69 the slight motion of the lever 66, caused by the arm 64 engaging the roll 65, disengages the hook 71 from the projection 72. Then the spring 48 is free to draw the lever 66 back toward the endless conveyor. On the arm 67 is a fixed plate 73 which has a flat end. This flat end will then come over from the position shown in Fig. 14 to that shown in Fig. 15 and move the article or bottle to be labeled off the conveyor over a stationary platform 74 into a position A on the table 25. There the bottle is arranged in what may be called a circumferential position between the walls of a notch 75 in a removable plate 90. These plates are made removable so that when bottles of a different size or shape are being labeled the plates can be replaced by others having notches corresponding thereto.

It will be understood that at this instant the table is not moving, its motion being intermittent as explained above. When the above action takes place, the convex portion of the plate 73 acts as a stop for the next bottle and, although the conveyor is moving, the whole line of bottles is held stationary until the lever 66 has moved back to its extreme outward position where the next bottle can then engage the lever 69 and the operation will be completed.

During the travel of the bottle from the conveyor to the table, a plate 76 pressed outwardly by a spring 77 engages the bottle and holds it against the lever 69 which guides it to its proper position between the walls of the positioning notches 75. This action results in transferring one bottle from the conveyor to exactly its proper position on the table and holds the other bottles back until the table has rotated through one-sixth of a revolution, in the construction shown, to the position B. These operations having been performed, the table turns another step to bring that bottle into the position B. In that position the first gumming actions take place.

The vertical shaft 24, as stated, has a sleeve 36 which is stationary, and on this sleeve is fixed a cam 78. The table carries a series of vertical slidable plungers 80, six in the form shown. Each plunger carries at the bottom a roll 79 adapted to be raised by the cam 78. Each plunger 80 is guided in a tube 81 fixed to the table. A spring 82 under the table bearing on a key or cross piece 89 on the plunger 80 normally pushes the plunger down and keeps the roll 79 in position to contact with the cam 78. The spring is located on a hub 91 integral with the table, which has a diametrical slot for receiving the key 89 and allowing it to rise therein.

On the top of each plunger is a split collar 83 fixed to the plunger and adjustable circumferentially around it into proper position. This collar carries a plate 84 adapted to come down on the top of the bottle and hold it in place on the table. Also on this plate is a vertical stop 85 adapted to come against the side of the top of the bottle to limit its position and locate it. This stop 85 is adapted to be adjusted to the proper position by a nut 86 and a slot 87 through which the threaded stem of the stop passes. When the bottle is pushed on the table in the position A, it is pushed against this stop 85 and thus located and kept in that position all the way around the table as the table rotates. Each of these rods 80 and its corresponding parts around the table is held down by its spring after the bottle passes from the position A until it is ready to pass out of the machine, when the plunger is raised so that this bottle is released and another bottle can be received. When there are no bottles on the table the rolls 79 hang down unsupported except by stops 88 carried by the hubs 91 on which the springs 82 are carried.

On the top of cam 27 is a cam 94 which, of course, rotates constantly. Once during each rotation it engages a roll 95 and lifts a pivoted lever 96. This, by a link 98 lifts a cam element 97, which is pivoted to the end of the cam 78. Its top surface constitutes a continuation of the cam. When the roll 95 is raised by the cam 94 the element 97 will hold up the plunger 80 that is just above it. In Fig. 17 this is the plunger that is in the bottle receiving or A position and the bottle can be pushed on the table under that plate or bottle gripper 84 and aginst the stop 85.

It will be remembered that the cam 78 is stationary and the element 97, of course, is always directly under the position or station A. As the shaft 24 continues to rotate the roll 95 drops off the cam 94 and lets that plunger down. If a bottle has been placed on the table 25 it will be clamped down by the action of the spring 82. This action is sudden. The bottle stays clamped throughout almost a complete rotation of the table. This particular bottle thus passes to the position B, clamped down. Then the table stops in the manner described and a second bottle is introduced at A and then clamped down by the rotation of the cam 94. This constitutes a very effective and quick acting means for controlling the clamping of a bottle on an intermittently rotating table by the action of a constantly rotating shaft which operates the table.

The shaft 17 at its end by means of a pair of bevel gears 100 operates a horizontal shaft 101. On this shaft is a cam or eccentric 102 operating a cam roller 103 on a lever 104. A spring 105 holds the roll 103 against the cam. By an adjustable link 106 the lever 104 transmits its motion to a lever 107 pivoted at 108 on the frame. This lever, during the rotation of the shaft 101, moves between the full line and dotted line positions in Fig. 22.

On the end of the lever 107 is a plate 92 on which is slidably mounted a frame 109 carrying a soft rubber gumming device 110. Springs 111 normally force this frame inwardly toward the bottle in the position B on the table 25.

The frame 109 is provided with slots 112 and pins 113 are provided on the plate 92 so as to allow some play controlled by the springs 111. This gumming device after being gummed, as explained below, comes up against the bottle, in the position B' shown in Fig. 22. The result is that a spot of gum at 114 is located on the bottle, preferably in central position and occupying only a small proportion of the total area that is to be labeled, as for example, perhaps one-third.

The gumming of this soft gummer 110 is performed through the operation of another cam 115 on the shaft 101. This cam operates a roller 116 on a spring operated lever 117. This lever through an adjustable link 118 operates a lever 119 pivoted at 120 and carrying a transfer roll 121. This roll is adapted to gum the surface 110. Also on the shaft 101 is a sprocket wheel 122 operating an endless chain 123 over guide sprockets 124 to rotate a sprocket wheel 125. On the shaft of this sprocket wheel is a gear meshing with a gear 126 on the shaft of the gum roller 127.

It will be seen that the rotation of the shaft 101 rotates the gum roll in a gum box 128 which is removably fixed in position by a clamp 129. Furthermore the roll 121 is moved from contact with the roller 127 along the surface of the gummer 110 while the latter is moving in the direction of the arrow shown in Fig. 21, thus giving the result shown in Fig. 24.

It will be noted that this applies a spot of gum on the flat surface of the bottle to which the label is to be applied, but this spot of gum does not occupy the whole surface of the label. The label is gummed throughout the rest of its surface by another mechanism as will appear later.

It will be seen that at station B the spot of adhesive 114 is placed on the bottle as indicated in Figs. 21 to 24. Now the table is indexed around so that the same bottle comes to the position C. Here the mechanism is operated by the shaft 17 on which is a picker cam 130. This cam operates a roll 131 on a lever 132 in opposition to a spring 133. This is a so-called broken lever having a jackknife joint and provided with a strong spring 134 for normally keeping the lever in straight position as indicated in Fig. 28. This lever has a pivot stud 139 which, by means of an adjustable link 140 operates a lever 141 supported by the frame 10 and pivoted on a stud 142 thereon. This lever carries the pickers 143. These pickers move back and forth from the full to the dotted line position in Fig. 24, each time taking a label from the label holder 144. This label holder is mounted on the frame 10 and the details of it will not be described as an ordinary one is illustrated and any kind of a label holder feeding from the bottom or the end can be used. It is mounted on a rod 145 and held in fixed position, after it has been swung down about that rod, by means of a screw 146 engaging the frame.

The picker fingers are gummed by the following mechanism: On the shaft 17 is a transfer roll cam 150 operating a roll 151 on a lever 152 which is pivotally connected by an adjustable link 153 with a pivoted lever 154 which carries a transfer roll 155. This roll operates on the surface of a gummed roll 156 rotated by a chain drive 157 from a sprocket wheel on the shaft 17. This roll is journalled in a gum box 158 which is secured at one end to the frame by a clamp 159 and is mounted at the other end by a stud and slot connection 160 on the frame so as to be easily removed for cleaning and replaced. It rests against an adjusting screw 161 on the frame. The path of the transfer roll is indicated by dot and dash lines in Fig. 25 and it comes against the faces of the picker fingers which engage the labels. This motion takes place during a part of the motion of the picker fingers toward the labels. It will be noticed that the path of the transfer roll is restricted to an arc, but that is entirely possible because the picker fingers themselves are provided with the yielding connection 133.

It will be obvious that when the label is brought into contact with the bottle it will engage the gummed surface 114 at the center. The picker fingers are so located and of such an area as to gum all or nearly all the rest of the rear surface of the label. They merely place the label on the bottle where it otherwise would be held only by the gummed surface 114 but, before the picker fingers draw back from the bottle, a grip finger 163 comes up to the dotted line position in Fig. 25 between the grip fingers and spots or presses the label on the bottle over the gummed surface 114.

This grip finger is operated by a cam 164 on the shaft 17. The cam operates a roll 165 on a lever 166 in opposition to a spring 167. The lever is pivoted at 168 on the frame and its free end is connected by an adjustable link 169 with a lever 170 on which is an arm 171. This arm carries the grip finger 163 which is provided with a soft surface of rubber or some other yielding material. The metal part of the grip finger has ears extending across the arm 171, provided with slots 172 and the arm has pins 173 in those slots to give a little freedom of action.

In this way the label is provided with two spots of gum at its opposite ends and placed against the bottle by the pickers. The grip finger comes up at the same time or nearly so and presses the label against the bottle where it adheres to the previously gummed spot on the bottle. All this is done at station C. Now the pickers first move back and release the label and then the grip finger moves back leaving the label in this position.

The above description shows the method of operation when there is a bottle clamped on the table in this position C, but many times it is desired to run the machine for adjusting and other purposes without any bottles in place and it is not desired to remove the label holder or picker fingers at that time. Means is provided for preventing the pickers from swinging to label holders during such an operation. This is indicated in Fig. 29. There no bottle is in position and the spring 82 forces the plunger 80 down as far as it will go. The roll 79 on this plunger engages the top of a lever 175 which is pulled in one direction by a spring 176 and operates through a link 177 a stop plate 178, which is pivoted at the top to the frame. On the link 140 is a collar 179 which is adapted to be adjusted into the proper position. When the spring 176 is free to move the plate outwardly, this collar moves up and down by it freely as shown in Fig. 28. When the plate 178 is pushed inwardly by the roller 79 it engages the collar 179 of the link 140. It is to allow for this that the lever 132 is provided with a jack knife joint. Now the cam 130 can rotate and move up the roll 131 against the opposition of the spring 134 without fully operating the picker. Now the table is indexed around one more step and this particular bottle comes to station D.

In position D two actions may be said to be performed as the indexing and stop device shown in Figs. 7 to 10 is located in this position. The other operation is shown in Figs. 30 to 32.

On the vertical shaft 24 there is a cam or eccentric 180 which operates a roll 181 on a lever 182 pivoted on the frame. This lever is pivotally connected by an adjustable link 183 with a lever 184. This lever 184 is pulled forward by a spring 185 which keeps the roll 181 against the cam 180. Once during each rotation of the shaft 24 this lever is pulled forward to operate a slide 186 operating in guides carried by the frame. This slide carries at the end a label presser head 187 covered with a layer of rubber 188 or other soft material. As shown in Figs. 31 and 32 this acts to press the label over its entire surface against the flat or other surface of the bottle which, of course, is held in the bottle grip. The result is that the label is firmly fixed to the bottle.

The above description has been made in such language that it seems to be applicable especially to flat surfaced bottles, cans, and the like, but of course, the same machine, perhaps with modifications, could be used to label articles of nearly any shape.

For the purpose of showing how it could be used for labeling circular bottles and cans, Figs. 33, 34 and 35 are presented. Here a label is shown as being applied to a round bottle, and the only thing that is necessary to change is the means for insuring the sticking of the entire surfaces of the label to the article, usually called the "label wiping device" in a machine of the kind shown in these three figures.

When the bottle has reached the position D, the label is wiped thereon by a device operated by the slide 186 which is connected up in the same manner as disclosed in the other figures. This slide is provided with a plate 190 having a soft rubber layer 191 thereon constituting a concave surface for engaging the center of the label and holding it against the bottle. These two parts are substantially of the same shape as the bottle at this point.

The slide 186 also has a cam 192 fixed thereon. Above the slide 186 is a second slide 193 which carries a head 194 on which are two opposite pivots 195. Each pivot carries an arm 196 oscillatable on the pivot and connected directly with a wiper arm 197 on which is a soft surfaced wiping roll 198. A spring 199 holds these two rolls 198 normally against the label holding element 190. A pair of stop screws 200, adjustable and working against stops, limit the innermost position of the rolls 198 as shown in Figs. 33 and 34.

The slide 186 is pushed in in the manner shown in Figs. 30 and 31. This brings the central label holding device 190–191 up against the bottle, as shown in Fig. 34, although at this time the rolls 198 are still in the position shown in Fig. 33 and the label nearly in that position. Now the slide 193 is forced in by mechanism, such as that shown in Figs. 30 and 31. The first result of this is to allow the rolls 198, which are pulled together by the spring 199, to move over the label on the bottle and wipe it around to the position shown in Fig. 34, where they have completed the wiping operation. Nothing is interposed to prevent these rolls from following the surface of the bottle around at this point no matter what its shape may be. The further inward movement of the slide 193 brings the arms 196 into contact with what is now the stationary cam 192, and this spreads the rolls 198 apart, as shown in Fig. 35. Now both slides 186 and 193 are moved to the left together with the other parts in the same position and the rolls are drawn away from the bottle without touching it again.

The operation of the machine has been described in connection with the various motions.

The machine is particularly adapted for placing a label on the flat surface of a bottle or the like but it is capable of being used on a concave or convex surface and the device shown in Figs. 33 to 35 indicates that the label wiping device has to be changed in case of a cylindrical surface. The bottles, cans or cartons are conveyed to the machine, preferably by a conveyor, and placed on the conveyor at the point 57. From here they are taken along by the conveyor and advanced in a line between the guides 59 to the point at which they are pushed from the conveyor on the table in the position A. The bottle grips 84 have been raised previously but the bottles are stopped in the proper position by the stop 85 on the grip. The bottles are so placed that the surface on which the label is to be put is in a circumferential position with respect to the rotary table. The label grip now comes down on the bottle as soon as the bottle is moved from that position and the table is indexed around so that this particular bottle comes to the position B, clamped to the table. Here the table stops and the spot of adhesive 114 is applied to the bottle by means of a gumming device, which is supplied with gum in a way that has been described. This is the only operation up to this point.

Now the table moves to the position C, with the bottle still clamped down, and here the label is taken from the label holder, gummed, and applied to the bottle. The gumming here is on the two ends of the label outside the area 114 so that now the label will be gummed all over its surface. The label is held up against the bottle in the center by the grip finger 163.

Now the table advances another step and either the label-pressing device 188 or the label wiping devices 191 and 198 act upon it to smooth the label down over its entire area and stick it to the bottle. The table advances another step and the bottle comes to the position E where it is still gripped down on the table. No operation is performed on the label at this point, in accordance with the present showing, but this station is made so that some other operation may be performed if desired.

Now this bottle advances to position F where it comes in between the curved part of the outlet guides 59 and the bottle grip 84 is raised to free the table. On the next motion of the table the bottle is carried around and directed by these guides 59 back on the conveyor, where it is, of course, delivered, eventually coming under the plate 58 where the conveyor passes over its curved portion at the end.

It will be noted that the bottle grip is provided with means whereby it is operated by a cam 78 to raise it and held up by the extension 97 of that cam which suddenly descends to allow the spring 82 to bring the bottle grip down firmly on the top of the bottle.

It will be seen also that this grip is controlled to prevent the operation of the pickers by the means shown in Figs. 28 and 29, if the table is turned without any bottles upon it, so that the picker fingers will not pick any labels. The bottle gripping means is of a simple character and takes up very little room. The means for advancing the bottle from the conveyor to the table is also comparatively simple and eliminates the rotary turret usually employed at this point. Also the turret employed at the delivery point is done away with. This does away with considerable mechanism and economizes in the space occupied. The space used is considerably smaller than the space heretofore employed, due to the fact, partly that these turrets do not have to be used and partly to the fact that the table does not have to be provided with a series of label grips or holders. These are employed only at station D, really, although, of course, the label is held on at station C in a preliminary way. The whole machine is simplified in these various respects.

Although I have illustrated only one form of the invention, with a single modification of a part of it, I am aware of the fact that other modifications can be made in the various elements, by any person skilled in the art, without departing from the scope of the invention as expressed in the claims. Therefore, I do not wish to be limited in this respect but what I do claim is:—

1. In a labeling machine, the combination of an intermittently rotary table having means on the top thereof for holding the articles to be labeled and releasing them, said table having a series of notches near the edge thereof, a tooth adapted to engage in each of said notches in turn to register the table and hold it in stationary position between its motions, a constantly rotating shaft, means connected with said shaft for rotating the table intermittently through an arc extending from one notch to the next, and means on said shaft for operating said tooth to move it into one of the notches as soon as the table has come to rest.

2. In a machine for labeling articles having sides, the combination of a rotary table, means for rotating said table intermittently, a conveyor passing adjacent to the table, and means timed with respect to the rotation of the table for moving an article to be labeled off the conveyor radially on the table, while at rest, and having the article in a position with the side to be labeled arranged tangentially with respect to the table.

3. In a machine for labeling an article having a flat surface, the combination of a rotary table having means for clamping a plurality of articles to be labeled thereon, means for rotating said table intermittently, a conveyor passing adjacent to the table, and means timed with respect to the rotation of the table for moving an article to be labeled off the conveyor radially on the table, while at rest, under one of said clamping means, and leaving the article in a position with the surface to be labeled arranged tangentially with respect to the table.

4. In a labeling machine, the combination with a rotary table, a continuously rotating means, means operated by the said shaft for intermittently rotating the table, an endless conveyor passing adjacent to the table and tangent thereto, means operated by said constantly rotating means for operating the conveyor, a cam operated by the last named means, and means operated by the cam for forcing the articles, one at a time, from the conveyor to the table.

5. In a labeling machine, the combination with a rotary table, a constantly rotating shaft, means operated by the shaft for intermittently rotating the table, a conveyor located adjacent said table, a shaft connected with and operated by the first named shaft, a second shaft having a cam, a rod having an arm with a cam roller thereon, said roller being in contact with the cam, whereby the rotation of the cam will oscillate said rod on its own axis, an arm on the rod, a device located over the conveyor for pushing articles from the conveyor on the table, and a spring for normally moving said means inwardly toward the table, said arm having means for moving it back away from the conveyor.

6. The combination with an intermittently rotatable table and a constantly running conveyor, of an arm movable over the conveyor to push an article therefrom on the surface of the table, said arm being located on a pivot, yielding means for moving said arm to transfer the article to the table, and means connected with the conveyor for periodically moving the arm back.

7. In a device for transferring articles from one position to another, the combination of a pivoted frame, an arm rigidly mounted thereon and having an end for moving the article, positive means for periodically moving said arm back into a position for starting to move an article, and yielding means constantly in action for moving the arm forward.

8. In a device for transferring articles from one position to another, the combination of a pivoted frame, an arm rigidly mounted thereon and having an end for moving the article, means for periodically moving said arm back into a position for starting to move an article, a stationary projection, a plate pivotally mounted with respect to said arm and adapted to be engaged by the article to be moved, and yielding means for moving the plate toward the article, said plate having a hook connected therewith adapted to engage said projection to hold the frame back in inoperative position until one of the articles to be moved engages said plate and releases the hook.

9. The combination of a rotary table and a conveyor adjacent thereto for moving articles therealong, with a pivoted frame, and an arm rigid on said frame, the end of which is adapted to engage an article on the conveyor and push it on the table, said arm having a convex surface thereon substantially concentric with the pivot of the arm for engaging the next article on the conveyor and holding it in stationary position as the arm operates.

10. In a device for transferring articles from one position to another, the combination of a pivoted frame having an end for moving the article, means for periodically moving said arm back into a position for starting to move an article, means for moving the arm forward, a plate pivotally mounted with respect to said arm and adapted to engage the article to be moved, yielding means for moving the plate toward the article, and a spring pressed plate for engaging the article on the opposite side of the first named plate during its passage from the conveyor to the table and thus furnishing yielding guides on opposite sides for the article.

11. In a labeling machine, the combination of a constantly rotating shaft, a rotary table centered by said shaft but not fixed to it, means on said shaft for rotating the table intermittently while the shaft rotates constantly, the table having a hub extending downwardly, and a sleeve located between the shaft and the hub, said sleeve being fixed.

12. In a labeling machine, the combination of a vertical constantly rotating shaft, a stationary sleeve on the shaft extending to the top thereof, said sleeve having a shoulder, a soft washer on said shoulder, a hub on the sleeve resting on the washer, a labeling table carried by said hub, a ratchet on the hub, an oscillatable member carried by the hub and having a pawl for engaging said ratchet, and means connected with the shaft for oscillating said member through one complete motion at each rotation of the shaft, whereby the table will be rotated intermittently by the constant rotation of said shaft.

13. In a labeling machine, the combination of a constantly rotating vertical shaft, a cam on said shaft, a vertical rod having an arm engaging the cam to be oscillated thereby, a second arm fixed to the shaft, a member freely mounted on said shaft, means connected with the second arm for oscillating said member, a spring pawl carried by the member, and a rotary table centered by said shaft and having a ratchet wheel thereon which said pawl is adapted to engage to rotate the table by a step-by-step motion.

14. In a labeling machine, the combination of a vertical constantly rotating shaft, a rotary labeling table, means for centering said table upon the shaft, means operated by the shaft for rotating the table intermittently while the shaft rotates constantly, a stationary member concentric with the shaft having a cam thereon, a series of article grippers carried by the table, each one comprising a vertical plunger, yielding means for holding the plunger and gripper down on the article, and a roll on the plunger adapted to engage said cam when that particular plunger reaches the right point, whereby the cam will raise the plunger and release the article.

15. The combination of a labeling table, means for rotating the table by a step-by-step motion, a rotatable cam, a fixed cam of arcuate shape, a series of article grippers carried by the table, each comprising a plunger with a roll, said fixed cam being located to engage each of the rolls when it comes to a certain point and lift the article gripper, a cam element movably connected with the stationary cam for holding the article gripper up after the roll leaves the stationary cam, and means operated by the rotatable cam for dropping said element when the shaft reaches a certain point in its rotation.

16. In a labeling machine, the combination of a vertical constantly rotating shaft, a labeling table supported by said shaft, means operated by the shaft for rotating the table by a step-by-step motion, a cam on the shaft rotatable therewith, a fixed cam of arcuate shape concentric with the shaft, a series of article grippers carried by the table, each comprising a vertical plunger with a roll at the bottom, said fixed cam being located to engage each of the rolls when it comes to a certain point and lift the article gripper, a cam element movably connected with the stationary cam for holding the article gripper up after the roll leaves the stationary cam, and means operated by the rotatable cam for dropping said element when the shaft reaches a certain point in its rotation, thus bringing the article gripper down on the article in position below it.

17. In a labeling machine, the combination of a constantly rotating shaft, a table centered on the shaft but not fixed thereto, means connected with said shaft for rotating the table intermittently, a series of article grippers carried by the table, a stationary cam in position to lift said grippers one at a time when they come to the position of the cam, a movable element carried by said cam and adapted to constitute a continuation thereof, a cam fixed to said shaft for holding said element up and the gripper free from the article during a predetermined part of the rotation of the shaft and to drop said element at another point to allow the gripper to come into contact with the article, and springs for holding the grippers down, whereby the raising of the gripper is controlled by the intermittent rotation of the table and also by the rotation of said shaft.

18. In a labeling machine, the combination of a constantly rotating vertical shaft, a labeling table centered by but free from said shaft, means controlled by the shaft for rotating the table by an intermittent operation, a series of article grippers carried by the table, means located in fixed position with relation to the rotation of the table for raising each gripper and holding it raised throughout a certain portion of the rotation, and means fixed on the shaft cooperating with the last named means to permit the raising of the gripper only during a predetermined portion of the rotation of the shaft.

19. In a labeling machine, the combination with a constantly driven vertical shaft and a labeling table concentric therewith, of a series of article grippers on the table, a stationary cam for raising each of said grippers as it comes to a certain point in the rotation of the table, an element pivoted to said cam for holding the labeling gripper up after it passes the cam, a cam fixed on the shaft, and means operated by the last named cam and connected with said element for controlling the time during which said element is raised into operative position and dropping said element to inoperative position at all other times.

20. In a labeling machine, the combination of a rotary table, a series of article grippers adapted to come down on the articles located on the table and hold them thereon, each gripper comprising a plate for engaging the top of an article, a stop carried under said plate which the article is adapted to engage for positioning the article, and means for moving an article on the table under the article gripper in a radial direction against said stop.

21. In a labeling machine, the combination with a vertical shaft, means for constantly rotating said shaft, and a horizontal rotary table located concentrically to said shaft but free therefrom, of means operated by the shaft for indexing the table around one step at a time, a plurality of article grippers carried by the table, means for normally forcing said grippers down on the articles, means for raising each gripper as it comes around to delivering position and holding it raised when it comes to receiving position, and means controlled by the shaft for suddenly dropping the gripper on the article when the table leaves the receiving position.

22. In a labeling machine, the combination with a table on which the articles to be labeled are carried, an article holding gripper adapted to come down on top of the article to hold it, a plunger connected with said gripper and extending through the table, a cross piece fixed to the plunger, a hub on the table having a slot in which said cross piece can move up and down, a spring on the hub pressing on the cross piece which projects through the hub at opposite sides to normally hold the gripper down, and means for raising the gripper to receive an article and to discharge it.

23. In a labeling machine, the combination with a rotary table adapted to be rotated intermittently and brought to rest in each of its different positions, of means for holding an article on the table, a shaft having a cam thereon, a lever connected to be operated by the cam, a frame movably mounted on the lever, a soft gumming device carried by the frame in position to apply an adhesive to the surface of the article to be labeled when on said table, and means for applying the adhesive to said gumming device when it is drawn back from the article.

24. In a labeling machine, the combination with a power shaft, of a shaft adapted to be operated thereby, a labeling table, means operated by the power shaft for rotating the table intermittently and bringing it to a stop between partial rotations, a gumming device, means operated by the second shaft for moving the gumming device into contact with the article to be labeled to apply adhesive throughout a certain area thereof, a gum box having a gum roll therein, means operated by said shaft for rotating the gum roll, a transfer roll, a lever on which the transfer roll is mounted, and means operated by said shaft for swinging said lever to bring the transfer roll into contact with the rotating gum roll and thereafter into contact with said gumming device.

25. In a labeling machine, the combination with means for holding the article to be labeled in a fixed position temporarily and means for applying a spot of adhesive directly to the article substantially in the middle of the surface to which the label is applied, of a picker finger, means for applying adhesive to the picker finger and means for moving the picker finger against a package of labels and then moving the picker finger into a position to place the label on the previously gummed spot on the article with the area of adhesive on the label at the side of said spot, the picker finger being outside the area at which the label engages the gummed spot on the article.

26. In a labeling machine, the combination of means for holding an article to be labeled in stationary position temporarily, means for applying a spot of adhesive substantially to the center of one face of the article to be labeled, picker fingers, means for gumming the picker fingers, and means for moving the picker fingers against a label to pick a label and then moving the picker fingers on opposite sides of the article to be labeled to deposit the label on the gummed surface on the article, the adhesive applied by the picker fingers occupying areas of the label outside and adjacent to the area of the label that is to come into contact with the gum on the article.

27. In a labeling machine, the combination of means for holding an article to be labeled in stationary position temporarily, means for applying a spot of adhesive substantially to the center of one face of the article to be labeled, a label holder, picker fingers, means for gumming the picker fingers, means for moving the picker fingers against the end label of the label holder to pick a label therefrom and then moving the picker fingers on opposite sides of the article to be labeled to deposit the label on the gummed surface on the article, and a grip finger for engaging the label throughout practically substantially the same area as the adhesive applied to the article to press the label thereon and hold the label thereto while the picker fingers move away from said article.

28. In a labeling machine, the combination of means for applying a spot of adhesive to the center of the article to be labeled, picker fingers for applying adhesive to a label, means for moving the picker fingers to take the label into contact with the adhesive on the article with the gummed surfaces adjacent to the gummed surface on the article, a soft surfaced grip finger for engaging the label on the surface opposite the adhesive on the article and means for adjusting said grip finger.

29. In a labeling machine, the combination with a rotary table having means for supporting articles to be labeled thereon, a set of picker fingers for applying a pasted label to said article, an article grip device having yielding means for pressing down on the article and holding the article on the table, and means whereby, when the table in its rotation passes the picker fingers without an article in position, the picker fingers will be prevented from operating fully.

30. In a labeling machine, the combination with a rotary table having means for supporting articles to be labeled theron, a set of picker fingers for applying a pasted label to said article, an article grip device having yielding means for pressing down on the article and holding the article on the table, a plunger on which the article grip is mounted projecting below the table, a cam for operating the picker fingers, a jointed lever having a roll for engaging said cam and operating the picker fingers, a rod connected with said lever and with the picker fingers for transmitting motion thereto, a collar on the rod, a lever, a stop plate connected with the lever, said lever being so proportioned and located that, when the article grip is in position to hold the article on the table, the lever will hold the plate out of the path of the collar on the rod but, when there is no article in position, the plunger will descend and turn the lever to move said plate into the path of the collar and thereafter the cam will raise and lower the roll but the lever on which the roll is located will break at each oscilation thereof on account of the fact that the collar is prevented from moving.

31. In a labeling machine, the combination with a rotary table, a plurality of means on the table for holding articles to be labeled, and means for intermittently rotating the table and stopping it in positions where said article holding devices will be located in the desired positions, of means for applying a label to an article in one position of the table, and means located in the next position of the table for forcing the label against the article throughout the area of the label.

32. In a labeling machine, the combination of an intermittently rotatable table, a series of gripping members on the table for gripping the articles to be labeled thereon, means at one of the positions where the table is stationary for applying a spot of adhesive to a central surface on the article, means at the next station for gumming the ends of the label and applying the label to the spot on the article and means at the next station for pressing the label against the table throughout the area of the label.

33. In a labeling machine, the combination with a constantly rotating shaft, a supporting table mounted on the shaft but independent thereof, and means operated by said shaft for rotating the table intermittently, of means for applying a label to an article thereon, and means operated by said shaft for pressing the label on the article throughout the area of the label.

34. In a labeling machine for labeling convex articles, the combination of a plate having a concave surface, a slide for moving said plate into contact with the label on the article, a pair of roller wipers on opposite sides of said plate, pivoted levers on which said rollers are mounted, yielding means for moving the rollers toward each other, a cam on said slide, and a second slide for moving the levers in a direction parallel with the movement of the plate, said levers having means for engaging said cam when brought forward and the cam is in stationary position, whereby the rollers will be separated as the second slide moves in.

In testimony whereof I have hereunto affixed my signature.

CHARLES H. OSLUND.